United States Patent

[11] 3,567,018

[72] Inventor  Arthur M. Moler
       Salt Lake City, Utah
[21] Appl. No. 797,828
[22] Filed     Feb. 10, 1969
[45] Patented  Mar. 2, 1971
[73] Assignee  Kennecott Copper Corporation
               New York City, N.Y.

[54] METHOD AND APPARATUS FOR FILTERING SLURRIES CONTAINING SOLID PARTICLES HAVING INTERLOCKING TENDENCIES
6 Claims, 3 Drawing Figs.

[52] U.S. Cl. .................................................. 210/67,
                                           210/229, 210/231
[51] Int. Cl. .............................................. B01d 25/12
[50] Field of Search ................................. 210/224,
                          226, 227, 228, 229, 231, 67

[56] References Cited
UNITED STATES PATENTS
3,347,383  10/1967  Augerot ..................... 210/229X
FOREIGN PATENTS
162,654    5/1903   Germany .................... 210/226
549,204    4/1932   Germany .................... 210/229
858,634    1/1961   Great Britain ............... 210/231

Primary Examiner—Reuben Friedman
Assistant Examiner—C. M. DiHow
Attorneys—John L. Sniado and Mallinckrodt and Mallinckrodt, P. H. Mallinckrodt and Philip A. Mallinckrodt

ABSTRACT: Improvements in a known method and apparatus for filtering slurries containing solid particles that have strong interlocking tendencies, e.g. metallurgical slurries, such as cement copper precipitates, by filter press techniques.

PATENTED MAR 2 1971

3,567,018

INVENTOR.
ARTHUR M. MOLER

BY Mallinckrodt and Mallinckrodt

ATTORNEYS

METHOD AND APPARATUS FOR FILTERING SLURRIES CONTAINING SOLID PARTICLES HAVING INTERLOCKING TENDENCIES

BACKGROUND OF THE INVENTION

1. Field

The invention is in the art of filter presses adapted to filter slurries under pressure to separate liquid and solid phases.

2. State of the Art

Filter presses for the filtering of a variety of types of slurries have been known and used for many years. These typically include an elongate structural framework, in and along which are mounted a series of plates that define a corresponding series of filter chambers for receiving, under pressure, a slurry to be filtered. Filter media, usually in the form of a filter screen or cloth or both stretched over a channelled support, are positioned at opposite sides of each plate for receiving and conducting away the liquid phase of the slurry, while rejecting the solid phase. The residue solids collect in the filter chambers between the plates and form relatively dry cakes. These are discharged when the press is opened by sliding the plates apart along the frame. Air pressure applied in reverse through the filter means may be employed to dislodge the filter cakes, or to dry the residue solids constituting the cake.

There have been limitations on the types of slurry that could be successfully handled by such presses, even with special arrangements such as conveying screws and vibrating bars for keeping flow passages open. Thus, so far as applicants are aware, there have never been successful commercial installations of filter presses for the handling of such difficult slurries as those containing cement copper precipitates that result from precipitating copper on metallic iron from solutions obtained by leaching copper ores, for example, in accordance with well-known procedures. The particles of precipitate copper have strong interlocking tendencies. Recent attempts to filter, by use of a commercial filter press, a slurry of precipitate copper derived from a large dump-leaching operation at an important copper mine were unsuccessful because of plate deformations due to localized excessive pressures within the press. Recommendations by the manufacturer of the press did not correct the difficulty.

SUMMARY OF THE DISCLOSURE

In accordance with the invention, it was found that the difficulty was due to random plugging of slurry feed passages leading to the filter chambers, resulting in localized areas of greatly excessive pressure that warped the plates and destroyed the usefulness of the filter press until the warped plates were replaced. It was only when the normal size of the slurry feed passages was increased sufficiently to prevent buildup of the solid particles phase of the slurry across such feed passages, that the problem was solved. It was found that this could be done without unduly reducing the filtering rate or increasing cake thickness to unwieldy proportions.

Filter presses can be either of recessed plate type or of flush plate and frame type, depending upon whether the plates are recessed to define, with adjoining plates, filter chambers at opposite sides thereof, or whether frames are interposed between adjoining flat plates to form the filter chambers. The invention is applicable to either type of filter press.

The manner in which the size of the slurry feed passages is increased in accordance with this invention is dependent upon the particular construction of the filter press in any given instance. In the filter press of the Augerot U.S. Pat. No. 3,347,383, which is a typical commercial type utilizing recessed plates of square or rectangular configuration, it is presently preferred to increase the size of the slurry feed passages by interposing an appropriately thick, sealing frame of polyurethane or like material between each set of adjoining recessed plates. However, there are a variety of other ways in which the desired increase in size can be attained, for example, by increasing the depth of the recesses in a customary recessed plate filter press and utilizing the customary packing material to seal the joinders between adjoining plates.

THE DRAWINGS

In the accompanying drawing, which illustrates a filter press construction presently contemplated as the best mode of carrying out the invention in actual practice:

FIG. 1 is a schematic view in front elevation of an Augerot type of filter press as it appears in closed condition during a filtering operation;

FIG. 2, a transverse vertical section taken on the line 2—2 of FIG. 1 and drawn to a considerably larger scale to show, in full face elevation, an individual filter plate of the press as conventionally formed; and FIG. 3, a fragmentary longitudinal section taken on the line 3—3 of FIG. 2 to show the frame elements added to the conventional filter plates to increase the size of the slurry inflow passages in accordance with the invention.

DETAILED DESCRIPTION OF ILLUSTRATED EMBODIMENT

Figure 1:
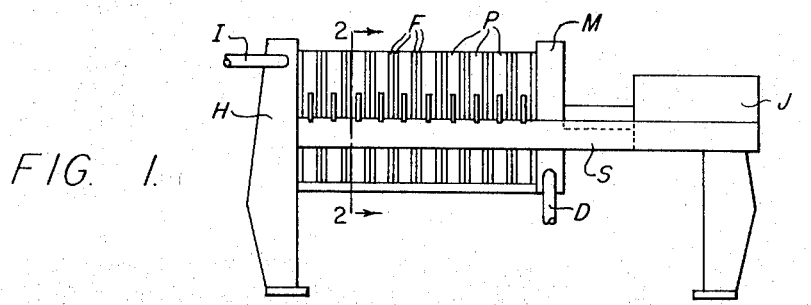

The filter press shown schematically in FIG. 1 includes a fixed head H mounted on a supporting structural framework S which carries a series of recessed plates P in mutually confronting, adjoining relationship along its length, separated only by a corresponding series of special sealing frames F. When the press is closed during the filtering of a slurry introduced through inlet pipe I, the plates P and frames F are clamped together by means of a movable clamping head M which is also carried by the framework S and actuated by a hydraulic or pneumatic jack J to maintain the filter plates and sealing frames in face-to-face, leak-proof relationship. Following any filtering operation, the press is opened by retracting clamping head M and by separating the plates either manually or by use of a known plate-shifting device.

As illustrated, the filter plates P are of the fabricated construction shown by Augerot in FIGS. 1—4 of his aforereferred-to U.S. Pat. No. 3,347,383. They could just as well be of the cast construction shown by Augerot's FIGS. 5 and 6, or of any other construction known to the art or suitable for a filter press of the general nature concerned.

Figure 2:
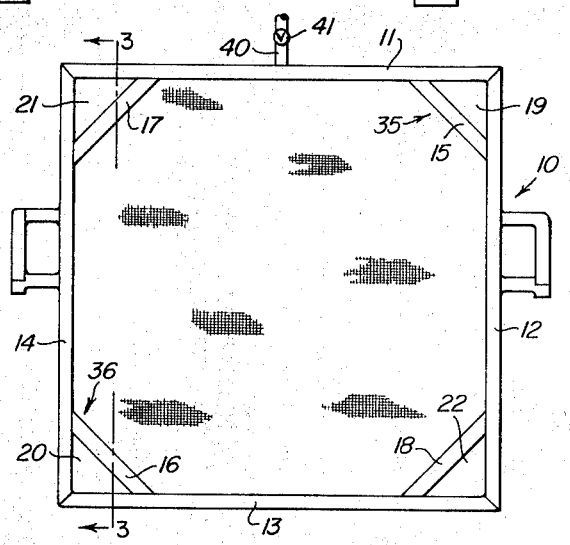

A typical filter plate, FIG. 2, includes a rectangular or a square frame 10 having four rectilinear side pieces 11, 12, 13, and 14 formed of steel bar or strip or of stainless steel or other corrosion-resistant metal, the pieces having their corners mitered and welded together to be rigid and self-sustaining. Spanning the corners of the plate frame 10 are diagonal frame members 15, 16, 17, and 18, which define inlet passages 19 and 20 and outlet or discharge passages 21 and 22. It will be seen from FIG. 3 that the diagonals 15 and 16 are of substantially less thickness than the frame members 11, 12 and 13, 14 to which they are welded, respectively, at their ends. This is the way in which slurry inflow passages, leading into the respective filter chambers from inlet passages 19 and 20, are conventionally formed in this type of filter press. The diagonal frame members 17 and 18 are of the same thickness as the frame members 11, 14 and 12, and 13 to which they are welded, respectively, at their ends.

Figure 3:
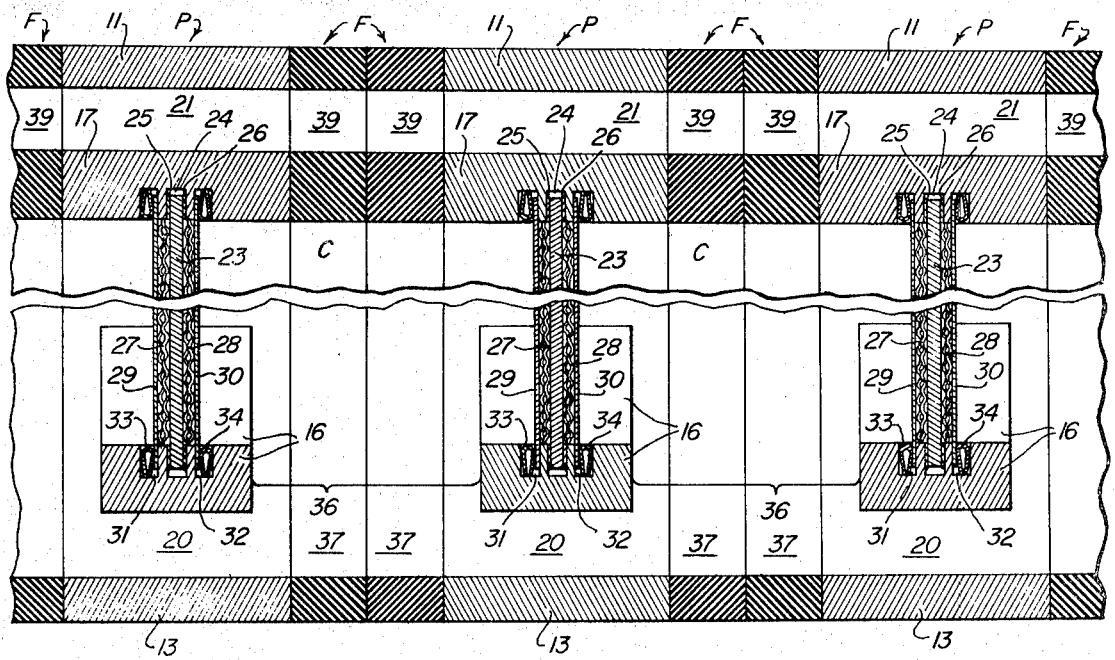

The plate frame members 11 to 14 and diagonal frame members 15 to 18 define an octagonal-shaped inner area which is spanned by a partition plate 23, FIG. 3, having its edges received in a groove 24 which extends completely around the inner periphery of the plate frame 10 so as to position the partition plate about midway of the thickness of such plate frame 10. Welded or brazed seams 25 and 26 fix the partition plate rigidly in the plate frame.

On opposite sides of the partition plate are located channeled members 27 and 28 formed, for example, of noncorrosive expanded metal, such as stainless steel, "Monel" metal, or the like. Outwardly of the channeled members 27 and 28 are layers of fine mesh screen 29 and 30, also formed of noncorrosive material, such as stainless steel, Monel metal, or the like.

The screens are held in place in respective receiving grooves 31 and 32 by means of spring strips 33 and 34 or other suitable calking means, all as is conventional in filters of this type.

For the purpose of providing slurry inflow passages 35 and 36 of increased size over the normal in accordance with the present invention, there are bonded to opposite faces of the plate frame 10 in this embodiment of filter press respective sealing frames F, FIGS. 1 and 3, which conform to plate frame 10 except for having no counterpart of the relatively thin diagonal frame members 15 and 16. That is to say, those corners of the sealing frames F, that correspond to the corners of the plate P which have the relatively thin diagonal frame members 15 and 16, do not have diagonal frame members. Thus, the sealing frames F add to the sizes of the respective slurry inflow passages 35 and 36 by amounts equal to the thickness of the respective sealing frames F. In accordance with the invention, the combined thicknesses of a pair of the sealing frames F is such as to increase the size of the corresponding inflow passages by an amount just large enough to prevent random plugging and localized plate-buckling pressures by buildup of solid particles across such slurry inflow passages.

As conventionally formed, the shortest dimension of a right cross section taken transversely across stream flow through the slurry inflow passages, i.e. the distance between mutually confronting diagonal frame members 15 or of the similar diagonal frame members 16 of adjoining filter plates P, is from about 1 to 1½ inches. It has been found that typical slurries of copper precipitates cannot be successfully handled because of plate deformations occurring during filtering operations.

Increasing the distance between the mutually confronting plate frame member 15 and the distance between the mutually confronting plate frame members 16 to over twice and usually to about three times the conventional in accordance with this invention, so as to be within the range of from substantially 2¾ to substantially 3½ inches, overcomes the difficulty, without introducing new difficulties. The normal approach to handling the difficulty would be to reduce this distance in order to increase the flow velocity and thereby keep the particles in liquid suspension. This was tried, but did not solve the problem.

There are various ways of increasing the distances between adjoining filter plates of a filter press to achieve the objectives of this invention; for example, the depths of the recesses at opposite faces of the filter plates P could be increased by making the frames 10 of such filter plates thicker than normal and utilizing the conventional packing material of the Augerot U.S. Pat. No. 3,347,383 as sealing gaskets. However, it is preferred to increase the distances by utilizing the illustrated sealing frames F. Although individual filter presses of a particular type, such as the Augerot type mentioned above and specifically illustrated herein, may differ among themselves in details of construction and operation, including size and throughput capacity, the specified shortest dimension of the slurry inflow passages corresponding to 35 and 36 herein must not be substantially more than the lower and upper limits of the range previously indicated if the filter press is to successfully handle slurries of dendritic copper precipitates or the like having a pulp density within the normal range of 4 to 15 percent solids wherein substantially all particles are no greater in size than 10 mesh, U.S. standard screen, and wherein particle distribution is roughly about 50 percent minus 325 mesh and about 50 percent plus 325.

A typical filter press of Augerot type designed especially for dewatering copper precipitate slurries has 16, 48 inches × 48 inches filter plates P, each 3 inches in overall thickness. Prior to this invention the thickness of each of the slurry feed passages (see 35 and 36) was 1 inch. By eliminating the conventional packing material between adjoining plates and by bonding frames F of polyurethane having respective thicknesses of 1 inch to opposite faces of such filter plates, the thickness of each of such slurry feed passages was increased to 3 inches, which proved ideal for overcoming the differential pressure and resulting plate-buckling problem. Moreover, filtering capacity was increased from 2.0 tons of dewatered precipitate per operative cycle to 2.8 tons without interfering with cake removal nor introducing other difficulties.

Reverting now to the illustrated filter press, it will be apparent that when a series of filter plates P and sealing frames F are held in face-to-face relation, all of the inlet passages 19 and all of the inlet passages 20 of the series of filter plates will be in alignment and in communication through the corresponding open corners, see 37, FIG. 3, of the sealing frames, as well as in communication with the several filter chambers C through slurry inflow passages 35 and 36, respectively. Also all of the outlet or discharge passages 21 and all of the outlet or discharge passages 22 in the series of filter plates P will be in alignment and in communication through the corresponding corner passages, see 39, FIG. 3, of the sealing frames, but none of these outlets communicate directly with the filter chambers C. The channels of members 27 and 28, which receive the liquid filtrate passing through screens 29 and 30, communicate with these outlet or discharge passages in conventional manner (not shown) and the filtrate flows through such passages, through the movable clamping header M, and to discharge through pipe D.

When a slurry of copper precipitates or the like is supplied to the inlet passages 19 and 20 of adjoining filter plates P, it flows through the inflow passages 35 and 36 and into the filter chambers C without difficulty. The liquid phase of the slurry passes through screens 29 and 30 and flows along the channels of members 27 and 28 as filtrate and thus to discharge, leaving the solids on the screens and in the filter chambers C.

When the filter chambers C are filled with residue solids, supply of slurry through pipe I is discontinued and air may be blown through the filter cake to remove much of the residual moisture. In the case of copper precipitates, this prepares them for charging into the usual reverberatory furnace.

As illustrated, air is blown through the filter cake by way of the channeled members 27 and 28 and screens 29 and 30. It is supplied to each filter plate P through a pipe 40, FIG. 2, that communicates directly with the channels of the members 27 and 28, as by a notch (not shown) in the partition plate 23 at the point of interconnection of such pipe with the groove 24. Supply of air is controlled by a valve 41.

The filter plates P and adherent frames F are moved apart along the framework S of the press to discharge the filter cake.

The overall depth, i.e. thickness, of each filter chamber C will be approximately 4 inches, resulting in a filter cake that is also approximately 4 inches in thickness and that will split through the middle when the adjoining filter plate and frame combinations are separated one from another. Although filter cakes of this thickness will tend to fall from the plate and frame combinations and can be easily removed if they don't completely fall free of themselves, increased thickness could give trouble.

It should be realized that the illustrated embodiment is merely one way of carrying out the invention within the generic teachings hereof.

I claim:

1. A method of filtering slurries of solid particles that have strong interlocking tendencies, comprising feeding into a filter press such a slurry under pressure between spaced, mutually adjacent plates constructed and arranged to form a corresponding series of filter chambers between adjoining plates and in which are formed respective cakes of the residue solids following extraction of moisture by passage of such moisture through filtering means adjacent to said plates and through outlet passages; and maintaining the respective sizes of the feed streams of said slurry through slurry inflow passages just large enough to prevent random plugging and localized plate-buckling pressures by buildup of solid particles across said streams, the shortest dimension of a right section taken across each such feed stream being within the range of from about 3.00 to 3.50 inches.

2. A method according to claim 1, wherein the specified shortest dimension is substantially 3 inches.

3. A method according to claim 1, wherein the slurry has a pulp density within the range of 4 to 15 percent solids, and wherein said solids consist essentially of particles of dendritic precipitate copper no greater in size than 10 mesh and distributed roughly about 50 percent minus 325 mesh and 50 percent plus 325 mesh.

4. The combination with a filter press, that includes a supporting framework, a series of filter plates constructed and arranged to form a corresponding series of filter chambers between adjoining plates for the reception of a slurry to be filtered and for the collection of residue solids remaining after the extraction of the liquid phase of the received slurry and also arranged to provide slurry inflow passages and filtrate outflow passages leading, respectively, into and from the respective chambers, of means for sizing the respective slurry inflow passages just large enough to prevent random plugging and localized plate-buckling pressures by buildup of solid particles across said passages, said means comprising structure associated with adjoining filter plates for adding to the normal thicknesses of said filter plates sufficiently to made the shortest dimension of a right section taken transversely across the slurry inflow passages formed thereby in the closed condition of the filter press within the range of from about 3.00 to 3.50 inches.

5. A combination in accordance with claim 4, wherein the structure makes the specified shortest dimension substantially 3 inches.

6. A combination in accordance with claim 4, wherein the thicknesses of respective filter chambers in the closed conditions of the filter press are approximately 4 inches.